March 11, 1969     J. J. LA PORTA     3,432,762

SWEEP CONTROL SYSTEM FOR AN OSCILLOSCOPE OR THE LIKE

Filed Feb. 16, 1965

INVENTOR
JOHN J. LA PORTA
BY James and Franklin
ATTORNEY

United States Patent Office 3,432,762
Patented Mar. 11, 1969

3,432,762
**SWEEP CONTROL SYSTEM FOR AN OSCILLO-
SCOPE OR THE LIKE**
John J. La Porta, Allendale, N.J., assignor, by mesne
assignments, to Spedcor Electronics, Inc.
Filed Feb. 16, 1965, Ser. No. 433,083
U.S. Cl. 328—179          12 Claims
Int. Cl. H03k 3/53

ABSTRACT OF THE DISCLOSURE

A sweep control system for an oscilloscope in which means are provided for preventing initiation of a sweep at any point in time other than at the beginning of a controlling signal such as a synch pulse, thus preventing the introduction of error arising from the occurrence of the end-of-sequence signal after the synch signal has appeared and before it has disappeared.

---

Figure 1:
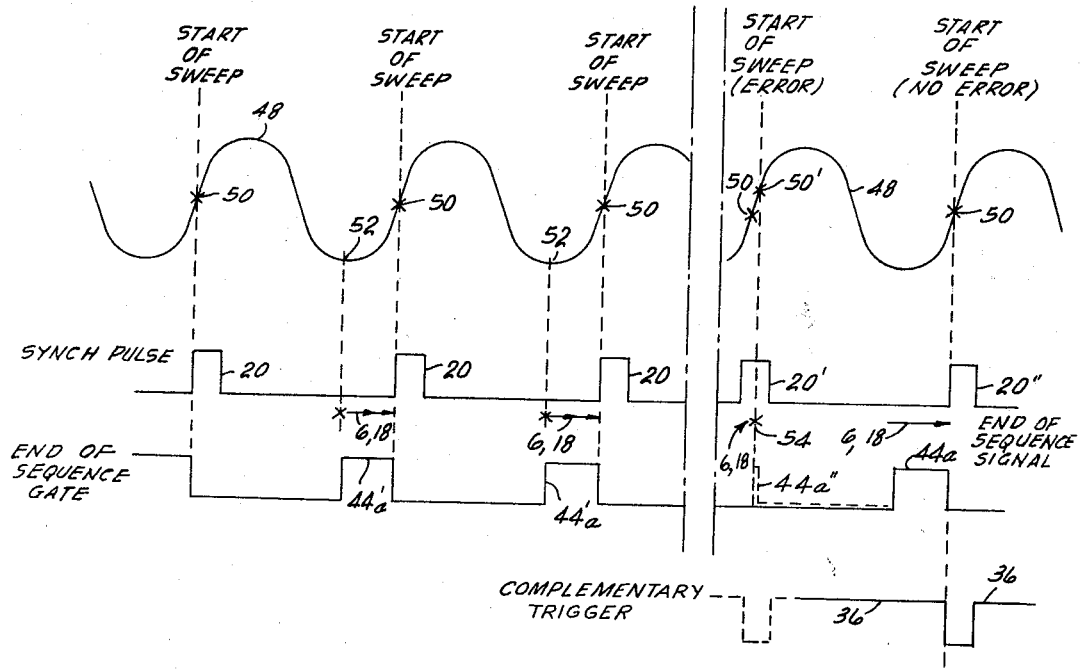

The present invention relates to a system of increased precision for controlling and initiating sweep sequences in oscilloscopes or the like.

In oscilloscopes or comparable electronic indicating devices a beam is periodically swept across a screen from one side to the other in accordance with a given parameter, usually time, and is subjected to a vertical deflection as it thus sweeps, that vertical deflection being in accordance with a different parameter such as the voltage of a phenomenon under investigation. When that phenomenon is of a periodically recurring type and the sweep is synchronized with the period of recurrence of that phenomenon, the picture which appears on the screen becomes a steady one, reinforced by each succeeding sweep, and constitutes a representation of the relationship between the sweep parameter and deflection parameter, e.g., constitutes a "graph" of the voltage of the phenomenon measured against time.

This synchronization is achieved by producing a series of recurring signal pulses, called "synch pulses" because they are employed for synchronization purposes, and by varying the frequency of those synch pulses so that it becomes some integral multiple of the frequency of the phenomenon. When this is done each sweep will start at an instant when the phenomenon under investigation is at the same position in its cycle. Once a sweep has been started the synch pulses may continue but are rendered ineffective until the sweep has finished and the sweeping system has reset itself, ready for another sweep. The "sweep sequence" may be considered to constitute the actual sweep which produces an indication on the screen, followed by the short period of time which is required for the beam to restore itself to its initial position.

Conventionally, when the sweep sequence has finished, an end-of-sequence signal is produced, and the simultaneous presence of a synch pulse and this end-of-sequence signal re-energizes the sweep system and starts a new sweep sequence. Those synch pulses which occur before the end-of-sequence signal arises, that is to say, during the time that the sweep sequence is underway, are ineffective. This arrangement is satisfactory in most instances, but it is subject to a source of error the significance of which become more important the higher the frequency of the phenomenon being investigated. That error arises as follows: As has been stated, a sweep sequence is initiated as soon as a synch pulse and the end-of-sequence signal exist simultaneously. The synch pulse is synchronized with the periodicity of the phenomenon under investigation so that each synch pulse commences at precisely the same point in the cycle of the phenomenon being investigated. However, the synch pulse itself has a finite duration, and if the end-of-sequence signal should first appear during the time that the synch pulse is in existence, and hence somewhat later than the time that the synch pulse commenced, the result will be that the sweep will be started at a slightly different point in time relative to the cycle of the phenomenon under investigation. The maximum magnitude of this error is determined by the duration of the synch pulse itself; the effect of this error on the screen display is determined by the frequency or rate of change of the phenomenon. The longer the duration of the synch pulse, or the greater the frequency or rate of change of the phenomenon, the more is the display affected. Thus, depending on the situation, the representation on the screen of the oscilloscope may become fuzzy, unduly wide, or jumpy, or a plurality of indivdiual lines might even appear on the oscilloscope.

The prime object of the present invention is to eliminate this error, and to ensure that each sweep will always start at precisely the proper point in time (provided that the synch pulses are properly synchronized) entirely independently of the length of time that the synch pulses themselves may exist.

In accordance with the present invention this result in accomplished by producing a complementary pulse or signal in the intervals of time between the synch pulses, and by providing means for permitting the end-of-sequence signal to be effective in conjunction with a synch pulse only after that end-of-sequence signal has existed simultaneously with a complementary signal. Since the complementary signal is produced only in the intervals of time between the synch pulses, it is impossible for the end-of-sequence signal to trigger a sweep at any time other than at the very beginning of the synch pulse. If the end-of-sequence signal were to start during a given synch pulse (the source of error which this invention is designed to avoid) nothing will happen because no complementary signal has coexisted with that end-of-sequence signal. After that given synch pulse has disappeared the complementary signal will appear, the end-of-sequence signal continuing. The simultaneous existence of the complementary signal and the end-of-sequence signal will then condition the system to start a new sweep as soon as the next synch pulse appears, the sweep thus being initiated at the beginning of that next synch pulse and thereby reliably recurring at the desired point in the cycle of the phenomenon under observation.

Figure 2:
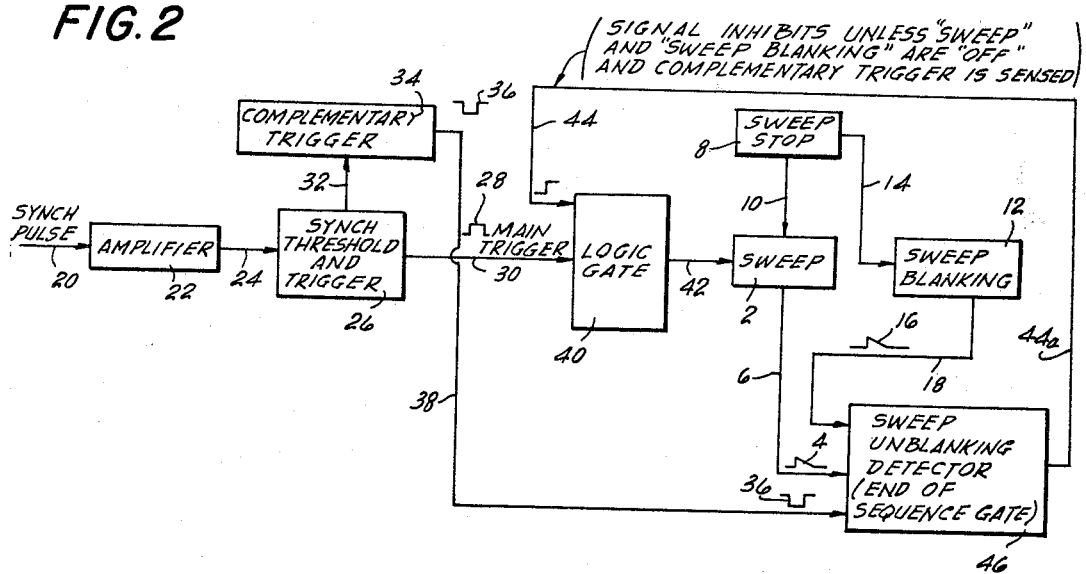

To the accomplishment of the above, and to such other objects as may hereinafter appear, the present invention relates to a system for sweep control in an oscilloscope or the like as defined in the appended claims and as described in this specification, taken together with the accompanying drawings, in which:

FIG. 1 is a graphical representation of the operation of the system of the present invention; and FIG. 2 is a block diagram of a typical embodiment of the system of the present invention.

It will be understood that the specific circuitry used to carry out the operational requirements of the system of the present invention may be widely varied, and that various types of circuit components are known to be useable to produce particular, more or less standard, results. The invention here does not lie in such specific circuitry or components, but instead resides in the organization of known circuits, components or subassemblies in a novel fashion in order to achieve the desired objectives. Accordingly, as is conventional under such circumstances, the invention is here disclosed in block diagram form. It will be further understood that the details of the oscilloscope itself and of the means for producing and controlling the sweep beam and producing an image on a screen or the like may take any desired form, and also constitute no specific part of the present invention.

Referring first to FIG. 2, which discloses the control system of the present invention, a sweep system 2 is generically disclosed which is designed, when actuated, to produce a sweep sequence, that sequence including the formation of a sweeping beam and the sweeping of that beam from one side to the other of a screen or the like. In order to prevent the start of a second sweep until after the first sweep has terminated the sweep system 2 produces an inhibiting voltage, a typical shape of which is illustrated at 4 and the transmission of which is schematically indicated by the line 6. After a predetermined period of time required for the sweep, a sweep stop system 8 actuates the sweep system 2, as indicated by line 10, so as to cause the sweeping beam to disappear, and actuates a sweep blank system 12, as indicated by the line 14, so as to cause the sweep to reset, the sweep blanking system 12, during the resetting period, putting forth an inhibiting voltage a typical shape of which is shown at 16 and the transmission which is represented by the line 18. In conventional systems when both of the inhibiting voltages 4 and 16 have disappeared (or, to put the matter another way, when neither of the inhibiting voltages 4 and 16 exist), an end-of-sequence signal is considered to exist which, in conjunction with a synch pulse (or a trigger signal produced by the synch pulse), is utilized to start the next sweep. (The absence of the voltage 4 can be considered as an end-of-sweep signal and the absence of the voltage 16 can be considered an end-of-sweep-reset signal, the end-of-sequence signal thus existing when both the end-of-sweep signal and the end-of-sweep-reset signal exist.)

In accordance with the present invention the synch pulse, represented by the line 20, which may if desired be amplified at 22, is fed at 24 to circuitry represented by the block 26 entitled "Synch Threshold and Trigger." This circuitry 26 will, when the magnitude of the synch pulse exceeds a predetermined value, produce a main trigger signal 28, the transmission of which is indicated by the line 30. The system 26 has an output 32 which actuates circuitry 34 for producing a complementary trigger signal 36, the transmission of which is indicated by the line 38. The complementary trigger signal is produced only in those intervals of time between the main trigger signals 28. Both of the trigger signals 28 and 36 are preferably of square wave shape, and it is usually desired that the main trigger signal 28 in particular have as abrupt a leading edge as is possible.

As indicated by the line 30, the main trigger signal 28 is fed to logic gate 40, which is of the AND-type, that is to say, it will have an operative output 42 only when both of its inputs 30 and 44 are simultaneously present in an operative sense.

The second input 44 to the logic gate 40 constitutes the operative output 44a from a sweep unblanking detector or end-of-sequence gate 46, that gate having three inputs, to wit, the end-of-sweep signal 6, the end-of-sweep-reset signal 18 and the complementary trigger signal 36. The gate 46 functions as follows: It will have no operative output 44a so long as either the inhibiting portion of the end-of-sweep signal 6 or the inhibiting portion of the end-of-sweep reset-signal 18 (the voltages 4 and 16 respectively) are present. It will have an operative output 44a only after the complementary trigger signal 36 is received by the gate 46 at a time when the inhibiting voltages 4 and 16 of the signals 6 and 18 respectively are both absent.

To put the matter in more positive terms, it may be considered that the end-of-sweep signal 6 is operative (the inhibiting voltage 16 thereof has disappeared) only after sweep reset has been accomplished. The simultaneous presence of the operative portions of the signals 6 and 18 may be considered as an end-of-sequence signal (designated 6, 18), that signal being present only after the entire sweep sequence (sweep and reset) has terminated. An operative output 44a will be produced by the gate 46 only when the end-of-sequence signal 6, 18 and the complementary trigger signal 36 are simultaneously received thereby, and that operative output 44a will continue thereafter for as long as the end-of-sequence signal 6, 18 continues, that is to say, until a new sweep is initiated and the inhibiting voltage 4 of the end-of-sweep signal 6 is produced.

Hence it will be apparent that the actuating input 42 to the sweep system 2, which is constituted by the output of the gate 40, will exist only when a main trigger signal 28 and an end-of-sequence gate operative output 44a simultaneously reach the gate 40 as inputs. Since the output 44a of the gate can come into being only after a complementary trigger signal 36, and since the complementary trigger signals 36 are produced only in time intervals between the main trigger signals 28 (or synch pulses 20), it will be appreciated that the output 42 of the gate 40 can commence only at the beginning of the main trigger signal 28, corresponding to the beginning of the synch pulse 20, and at no other time.

This will perhaps be better understood from an examination of FIG. 1, where the curve 48 represents a typical cyclical phenomenon under investigation by the oscilloscope. The left hand portion of FIG. 1 illustrates, without specific reference to the present invention, the ideal situation, in which each sweep is commenced at the same point 50 in the cycle of the phenomenon 48, the sweep cycle (including resetting), terminating at the same point 52, the end-of-sequence signal 6, 18, commencing at a point in time corresponding to the point 52 and thus producing an end-of-sequence gate signal 44a' corresponding thereto. Since as illustrated in the left hand portion of FIG. 1 the operative end-of-sequence gate signal 44a' starts before the next synch pulse 20 (or main trigger signal 28), the sweep is always started at the beginning of a synch pulse 20 (or main trigger signal 28), and hence always occurs at the same point 50 in the cycle of the phenomenon 48.

Turning now to the right hand portion of FIG. 1, let us assume that the sweep sequence (including sweep and reset) ends at a point in time designated 54 which occurs during the existence of the synch pulse 20' (or main trigger signal 28). As indicated in broken lines, in the absence of the present invention an operative end-of-sequence gate signal 44a" would be produced at a time corresponding to point 54 and this would cause a sweep to be initiated, but at a point 50' which is displaced from the point 50, thus producing an error in the display.

In accordance with the present invention the beginning of the end-of-sequence gate signal 44a at point 54 (the simultaneous presence of the operative portions of the end-of-sweep signal 6 and the end-of-sweep-reset signal 18) will be ineffective to start a new sweep, but will instead be held up by the gate 46 until such time as a complementary trigger signal 36 is received by the gate 46. Once the complementary trigger signal 36 is thus received, an operative output 44a from the gate 46 will result, and the next synch pulse 20" (or main trigger signal 28) will cause a sweep to occur, that sweep commencing at point 50, corresponding to the beginning of the synch pulse 20″ (or main trigger signal 28).

It will be appreciated from the above that as a result of the system here described sweeps are always commenced at the same point in time in relation to the finite duration of the synch pulses 20, thereby eliminating the possibility of display error arising when a sweep sequence terminates during the finite life of a synch pulse 20. As a result a more reliable and accurate display is produced.

While but a single embodiment of the present invention has been here disclosed, it will be apparent that many variations may be made therein, both as to the system itself and with respect to the individual components and circuitry used in various parts of the system, all without departing from the spirit of the invention as defined in the following claims.

I claim:

1. A sweep control system for an oscilloscope or the like comprising sweep means for causing a sweep sequence to occur, first means for producing a periodically recurring main signal, second means for producing a periodically recurring complementary signal during intervals between said main signals, third means operatively connected to said sweep means for producing an end-of-sequence signal when said sweep sequence has terminated, and control means operatively connected between said first, second and third means as inputs and said sweep means as output and effective to actuate said sweep means to initiate a sweep sequence only after, in each overall cycle, said main signal occurs after said end-of-sequence signal and said complementary signal have both existed at the same moment.

2. The system of claim 1, in which said end-of-sequence signal produced by said third means comprises an end-of-sweep signal and an end-of-sweep-reset signal which must be simultaneously present in order to constitute said end-of-sequence signal.

3. A sweep control system for an oscilloscope or the like comprising sweep means for causing a sweep sequence to occur, first means for producing a periodically recurring synch signal, second means operatively connected to said means for producing said synch signal so as to be controlled thereby for producing a periodically recurring complementary signal during intervals between said synch signals, third means operatively connected to said sweep means for producing an end-of-sequence signal when said sweep sequence has terminated, and control means operatively connected between said first, second and third means as inputs and said sweep means as output and effective to actuate said sweep means to initiate a sweep sequence only after, in each overall cycle, said synch signal occurs after said end-of-sequence signal and said complementary signal have both existed at the same moment.

4. The system of claim 3, in which said end-of-sequence signal produced by said second means comprises an end-of-sweep signal and an end-of-sweep-reset signal which must be simultaneously present in order to constitute said end-of-sequence signal.

5. A sweep control system for an oscilloscope or the like comprising means to produce a recurring main trigger signal and a recurring complementary trigger signal during intervals between said main trigger signal, sweep means for causing a sweep sequence to occur and for producing an end-of-sequence signal after said sequence has terminated, and gate means having an output operatively connected to said sweep means and having an input to which said means for producing said main and complementary trigger signals and said end-of-sequence signal are operatively connected, said gate means being effective to energize said sweep means to initiate a sweep sequence in each overall cycle only when said main trigger signal is received thereby after said complementary trigger signal and said end-of-sequence signal are simultaneously received thereby.

6. The system of claim 5, in which said end-of-sequence signal comprises an end-of-sweep signal and an end-of-sweep-reset signal which must be simultaneously present in order to constitute said end-of-sequence signal.

7. A sweep control system for an oscilloscope or the like comprising means actuated by a recurring synch pulse to produce a recurring main trigger signal and a recurring complementary trigger signal during intervals between said main trigger signal, sweep means for causing a sweep sequence to occur and for producing an end-of-sequence signal after said sequence has terminated, and gate means having an output operatively connected to said sweep means and having an input to which said means for producing said main and complementary trigger signals and said end-of-sequence signal are operatively connected, said gate means being effective to energize said sweep means to initiate a sweep sequence in each overall cycle only when said main trigger signal is received thereby after said complementary trigger signal and said end-of-sequence signal are simultaneously received thereby.

8. The system of claim 7, in which said end-of-sequence signal comprises an end-of-sweep signal and an end-of-sweep-reset signal which must be simultaneously present in order to constitute said end-of-sequence signal.

9. A sweep control system for an oscilloscope or the like comprising means to produce a recurring main trigger signal and a recurring complementary trigger signal during intervals between said main trigger signal, sweep means for causing a sweep sequence to occur and for producing an end-of-sequence signal after said sequence has terminated, first gate means having an input operatively connected to said means for producing said end-of-sequence signal and said complementary trigger signal and having an output, second gate means having an input operatively connected to the output of said first gate means and to said main trigger signal and having an output operatively connected to said sweep means, said first gate means having an operative output effective to function as an operative input to said second gate means only after said end-of-sequence signal and said complementary trigger signal have both been simultaneously received thereby, said second gate means having an operative output effective to energize said sweep means to initiate a sweep sequence in each overall cycle only when said main trigger signal and said operative output from said first gate means are simultaneously received thereby.

10. The system of claim 9, in which said end-of-sequence signal comprises an end-of-sweep signal and an end-of-sweep-reset signal both of which are operatively connected to the input of said first gate means and which must be simultaneously present in order to constitute said end-of-sequence signal.

11. A sweep control system for an oscilloscope or the like comprising means actuated by a recurring synch pulse to produce a recurring main trigger signal and a recurring complementary trigger signal during intervals between said main trigger signal, sweep means for causing a sweep sequence to occur and for producing an end-of-sequence signal after said sequence has terminated, first gate means having an input operatively connected to said means for producing said end-of-sequence signal and said complementary trigger signal and having an output, second gate means having an input operatively connected to the output of said first gate means and to said main trigger signal and having an output operatively connected to said sweep means, said first gate means having an operative output effective to function as an operative input to said second gate means only after said end-of-sequence signal and said complementary trigger signal have both been simultaneously received thereby, said second gate means having an operative output effective to energize said sweep means to initiate a sweep sequence in each overall cycle only when said main trigger signal and said operative output from said first gate means are simultaneously received thereby.

12. The system of claim 11, in which said end-of-sequence signal comprises an end-of-sweep signal and an end-of-sweep-reset signal both of which are operatively connected to the input of said first gate means and which must be simultaneously present in order to constitute said end-of-sequence signal.

No references cited.

ARTHUR GAUSS, *Primary Examiner.*

JOHN ZAZWORSKY, *Assistant Examiner.*

U.S. Cl. X.R.

315—25; 328—72, 181